(12) United States Patent
Mao et al.

(10) Patent No.: US 7,040,948 B2
(45) Date of Patent: May 9, 2006

(54) ENHANCED FIELD EMISSION FROM CARBON NANOTUBES MIXED WITH PARTICLES

(75) Inventors: Dongsheng Mao, Austin, TX (US); Richard Lee Fink, Austin, TX (US); Zvi Yaniv, Austin, TX (US)

(73) Assignee: Nano-Proprietary, Inc., Austin, TX (US)

( * ) Notice: Subject to any disclaimer, the term of this patent is extended or adjusted under 35 U.S.C. 154(b) by 306 days.

(21) Appl. No.: 10/879,979

(22) Filed: Jun. 29, 2004

(65) Prior Publication Data

US 2005/0001528 A1 Jan. 6, 2005

Related U.S. Application Data

(62) Division of application No. 10/680,941, filed on Oct. 7, 2003, now Pat. No. 6,798,127.
(60) Provisional application No. 60/417,246, filed on Oct. 9, 2002.

(51) Int. Cl.
*H01J 9/00* (2006.01)

(52) U.S. Cl. .......................................... 445/25; 445/50
(58) Field of Classification Search .................. 445/24, 445/25, 50, 51; 438/20
See application file for complete search history.

(56) References Cited

U.S. PATENT DOCUMENTS

| 5,773,921 A | 6/1998 | Keesmann et al. ......... 313/309 |
| 6,097,138 A | 8/2000 | Nakamoto ................... 313/309 |
| 6,448,701 B1 | 9/2002 | Hsu ........................... 313/309 |
| 2003/0092207 A1 * | 5/2003 | Yaniv et al. .................. 438/20 |

* cited by examiner

*Primary Examiner*—Joseph Williams
(74) *Attorney, Agent, or Firm*—Edward Mickelson; Winstead Sechrest & Minick P.C.

(57) ABSTRACT

The present invention is directed toward cathodes and cathode materials comprising carbon nanotubes (CNTs) and particles. The present invention is also directed toward field emission devices comprising a cathode of the present invention, as well as methods for making these cathodes. In some embodiments, the cathode of the present invention is used in a field emission display. The invention also comprises a method of depositing a layer of CNTs and particles onto a substrate to form a cathode of the present invention, as well as a method of controlling the density of CNTs used in this mixed layer in an effort to optimize the field emission properties of the resulting layer for field emission display applications.

12 Claims, 18 Drawing Sheets

A

B

C

A

B

ENHANCED FIELD EMISSION FROM CARBON NANOTUBES MIXED WITH PARTICLES

CROSS REFERENCE TO RELATED APPLICATIONS

The present application claims priority to U.S. Provisional Patent Application Ser. No. 60/417,246, filed Oct. 9, 2002.

TECHNICAL FIELD

The present invention relates in general to field emission devices, and in particular to field emission devices comprising carbon nanotubes.

BACKGROUND INFORMATION

Carbon nanotubes (CNTs) have intriguing physical and chemical properties which have consequently made them the object of numerous ongoing studies (Ajayan et al., *Top. Appl. Phys.*, vol. 80, p. 391, 2001; Dai, *Acc. Chem. Res.*, vol. 35, p. 1035, 2002). As a result of some of these studies, carbon nanotubes have been found to be excellent cathode materials for field emission displays because of their high aspect ratio and outstanding chemical inertness (U.S. Pat. No. 5,773,921). Single-wall carbon nanotubes (SWNTs) are hollow carbon fullerene tubes that have diameters from 5 angstroms to several nanometers (nm) and can be microns ($\mu$m) long or longer. Multi-wall carbon nanotubes (MWNTs) are similar, but comprise more than one concentric layer of carbon forming the tube. It has been suggested that aligned carbon nanotubes may have good field emission properties because they have higher geometric field enhancement (Wang et al., *Appl. Phys. Lett*, vol. 72, p. 2912, 1998). CNTs can be produced by chemical vapor deposition (CVD) (Nikolaev et al., *Chem. Phys. Lett.*, vol. 313, p. 91, 1999; Huang et al., *Appl. Phys. A*, vol. 74, p. 387, 2002), arc discharge (Journet et al., *Nature*, vol. 388, p. 756, 1997), laser ablation (Thess et al., *Science*, vol. 273, p. 483, 1997), and other techniques (e.g., Derycke et al., *Nano Letters*, vol. 2 (10), p. 1043, 2002). Additionally, vertically-aligned CNTs can be grown on substrates possessing nanoscale metal catalysts using CVD methods (Huang et al., 2002) at temperatures from about 550° C. to about 1200° C.

All of the abovementioned techniques, however, have poor growth uniformity and none can practically deposit carbon nanotubes over large areas. Furthermore, the growth conditions require relatively high temperatures, which impede their utilization with low-temperature and generally inexpensive substrate materials.

Another problem with using the abovementioned CNT growth techniques for generating the cathode material for field emission displays is that the density of the CNTs produced may be too high. Researchers have found evidence that the field emission properties of high density CNT cathodes is less than expected because the neighboring nanotubes shield the extracted electric fields from each other (Bonard et al., *Advanced Materials*, vol. 13, p. 184, 2001). As a result, high-resolution lithography has been employed to control CNT density by creating catalytic dots capable of growing CNTs (Huang et al., *Appl. Phys. A*, vol. 74, p. 387, 2002). This method is very expensive, however, and requires growth on high-temperature substrates.

Thus, there is a demonstrated need to be able to harvest fabricated CNTs and apply or dispense them onto various substrate materials at low temperatures. There is also a need to be able to control the density of the CNTs in an effort to optimize their field emission properties.

SUMMARY OF THE INVENTION

The present invention is directed toward a new cathode for field emission devices, methods for making such a cathode, and methods for optimizing the electron field emission performance of such a cathode by lowering the threshold field of emission and increasing emission current. Such a cathode comprises a cathode material, which in turn comprises carbon nanotubes (CNTs) and particles. Optimization of the electron field emission performance is accomplished by modulating the density of the field emitters (CNTs) within a particulate matrix material. It is believed that the optimal concentration of CNT fibers in the cathode material mixture (CNTs and particles) is that which leaves the highest number of CNTs available for emission, but not so high that they interfere with the performance of each other through electrical shielding of the applied field. Furthermore, such a mixture can be applied to a very wide range of materials since the processing can be done at room temperature and since the optimization of CNT concentration is substrate-independent. This method is also very economical in that no high-resolution lithography processing step is required. It is likely that any application involving the use of CNT materials as field emitters could potentially benefit from this invention.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
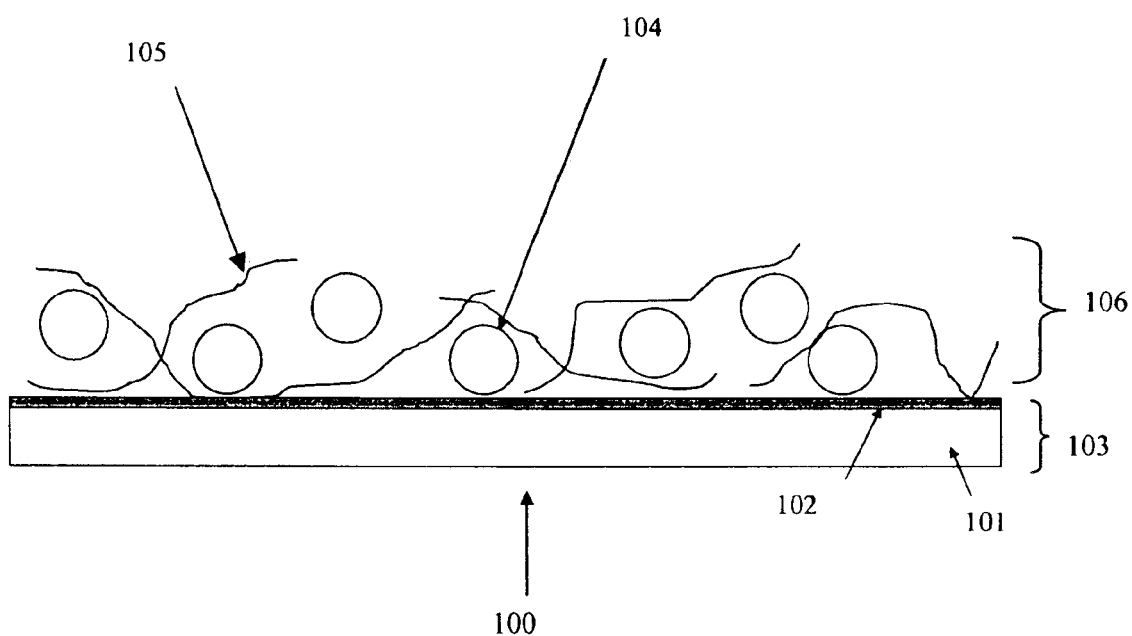
FIG. 1 illustrates a cathode comprising CNTs and particles.

The present invention is directed toward cathodes and cathode materials comprising carbon nanotubes (CNTs) and particles. The present invention is also directed toward field emission devices comprising a cathode of the present invention, as well as methods for making these cathodes. In some embodiments, the cathode of the present invention is used in a field emission display. The invention also comprises a method of depositing a layer of CNTs and particles onto a substrate to form a cathode of the present invention, as well as a method of controlling the density of CNTs used in this mixed layer in an effort to optimize the field emission properties of the resulting layer for field emission display applications.

CNTs, according to the present invention, can be single-wall carbon nanotubes (SWNTs), multi-wall carbon nanotubes (MWNTs), double-wall carbon nanotubes, buckytubes, carbon fibrils, and combinations thereof. Such CNTs can be made by any known technique, and they can be optionally purified. Such CNTs can be metallic, semiconducting, semimetallic, and combinations thereof. In some embodiments, the CNTs are chemically modified and/or derivatized. In some embodiments, the CNTs are metallized according to the techniques described in commonly-assigned and co-pending U.S. patent application Ser. No. 10/406,928, filed Apr. 4, 2003, and incorporated herein by reference.

The particles with which the carbon nanotubes are mixed can be of any material which serves to suitably reduce the density of the CNT material within the cathode so as to effectively enhance the field emission properties of the cathode when integrated into a field emission device. Such particles include, but are not limited to, spherical particles, disk-shaped particles, lamellar particles, rod-like particles, and combinations thereof. The material of such particles can be conductive, semiconducting, insulating, or combinations thereof. Such materials can include metals, alloys, polymers, semiconductors, dielectrics, clays, and ceramics. Dielectric materials that can be used include, but are not limited to, $Al_2O_3$, $CeO_2$, $La_2O_3$, $TiO_2$, $SiO_2$, TiC, WC, glass frit, diamond, and combinations thereof. Semiconductor materials that can be used include, but are not limited to, Si, GaAs, GaN, and combinations thereof. Metals that can be used include, but are not limited to, nickel, iron, chromium, alloys, and combinations thereof. These particles function as a matrix material for the CNTs and effectively reduce the interaction between CNTs with a consequence of enhancing field emission properties. Such particles can vary in size and shape, but generally have diameters which range from about 1 nanometer (nm) to hundreds of micrometers (μm).

In some embodiments of the present invention, the particles may also function to trap or hold the CNTs onto a substrate or in a CNT-particle matrix. As will be described later, some particles can be porous. Other particles, such as clays, can be layered—with gaps between the layers. These gaps can be dependent on the state of the clay. For example, if the clay is fully hydrated or saturated with molecules between the layers, the gaps can be several nanometers wide. CNTs or functionalized CNTs may enter the pores or gaps in the particles. This alone may be sufficient to hold or capture the CNTs. Furthermore, the hydrates or molecules between the layers in the particles may be taken out with certain processes such as heating and/or drying. This process can collapse the layers of the particles, further holding or capturing the CNTs.

A cathode comprising CNTs and particles is shown, as a typical embodiment, in FIG. 1. Referring to FIG. 1, the cathode comprises a substrate 103 on which a cathode material 106 is in contact. The cathode material comprises CNTs 105 and particles 104. In some embodiments, the substrate 103 is a glass base 101 supporting a conductive layer 102.

Figure 2:
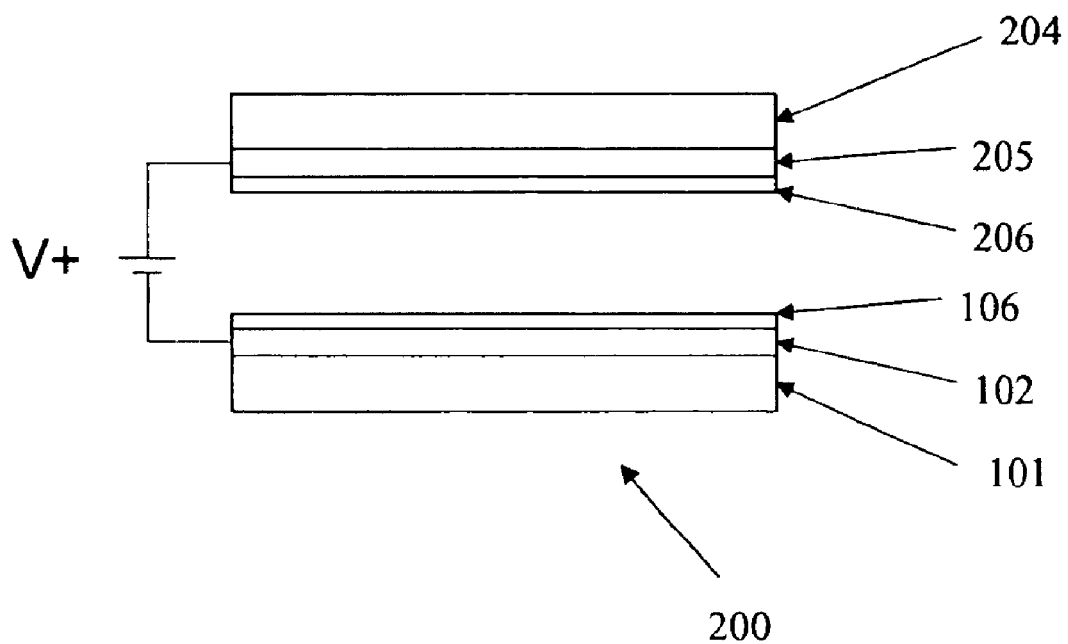
FIG. 2 illustrates a field emission display device incorporating the present invention.

An embodiment wherein the cathode of the present invention is incorporated into a field emission display device is shown in FIG. 2. Referring to FIG. 2, the cathode described above can be incorporated into field emission display 200. On base 101 is deposited conductive layer 102 on which the cathode material 106 is deposited. The anode includes substrate 204, which may be a glass substrate 204, conductive layer 205, which may be ITO, and a phosphor layer 206 for receiving electrons emitted from the cathode material layer 106. Electrons are emitted from layer 106 in response to an appropriate electric field between the anode and the cathode.

FIG. 2 shows a very simplified view of a display. Not shown in the FIG. 2 are the side walls that complete the enclosure of the gap between the anode and cathode. Also not shown are spacers that hold the gap between the anode and the cathode. In normal operation, the gap between the anode and cathode is evacuated to pressures in the range of about $10^{-6}$ Torr or better vacuum. Many displays have many independently addressable lines on both the cathode and the anode in order to create pixels and thus form the image on the anode. FIG. 2 also illustrates a diode display architecture. Other display architectures may have 3 (anode, cathode and grid) or more elements. In such cases, the addressing lines and columns are on the cathode and the grid; the anode is held at one potential. The invention described here is not dependent on the particular type of field emission display architecture (single pixel or multi-pixel, diode or triode, color or monochrome, etc.).

The density of the nanotubes in the cathode material is related to the weight of the CNTs relative to the weight of the particles. The weight percent of the CNTs can vary generally from about 0.1% to about 99%, and more specifically from about 40% to about 60%.

In some embodiments, the cathode material (CNTs+ particles) of the present invention is in the form of a layer. Depending on the application, this layer can vary in area and thickness. This layer has a thickness which ranges generally from about 10 nm to about 1 millimeter (mm), specifically from about 100 nm to about 100 μm, and more specifically from about 1 μm to about 20 μm.

In some embodiments of the present invention, the cold cathode comprises a substrate on which the cathode material resides. Such a substrate can vary widely in size and shape, but typically has a flat surface. The substrate can be of any material or combination of materials which suitably provides for a substrate according to the present invention. The substrate material can be selected from conductors, semiconductors, insulators, and combinations thereof. In some embodiments, the substrate comprises one or more stacked layers. In some embodiments, glass is used as the substrate.

In field emission devices, the cathode material of the present invention can enhance the field emission process by lowering the electric field needed to extract a current density of a particular value.

The methods by which the cathodes of the present invention are made generally comprise the steps of: 1) selecting an appropriate combination of carbon nanotubes and particles, 2) mixing the carbon nanotubes together with the particles, and 3) applying the mixture to an appropriate substrate.

Selection of CNTs and particles can vary depending on the desired application and method of processing used. Cost considerations can also play a role.

Figure 3:
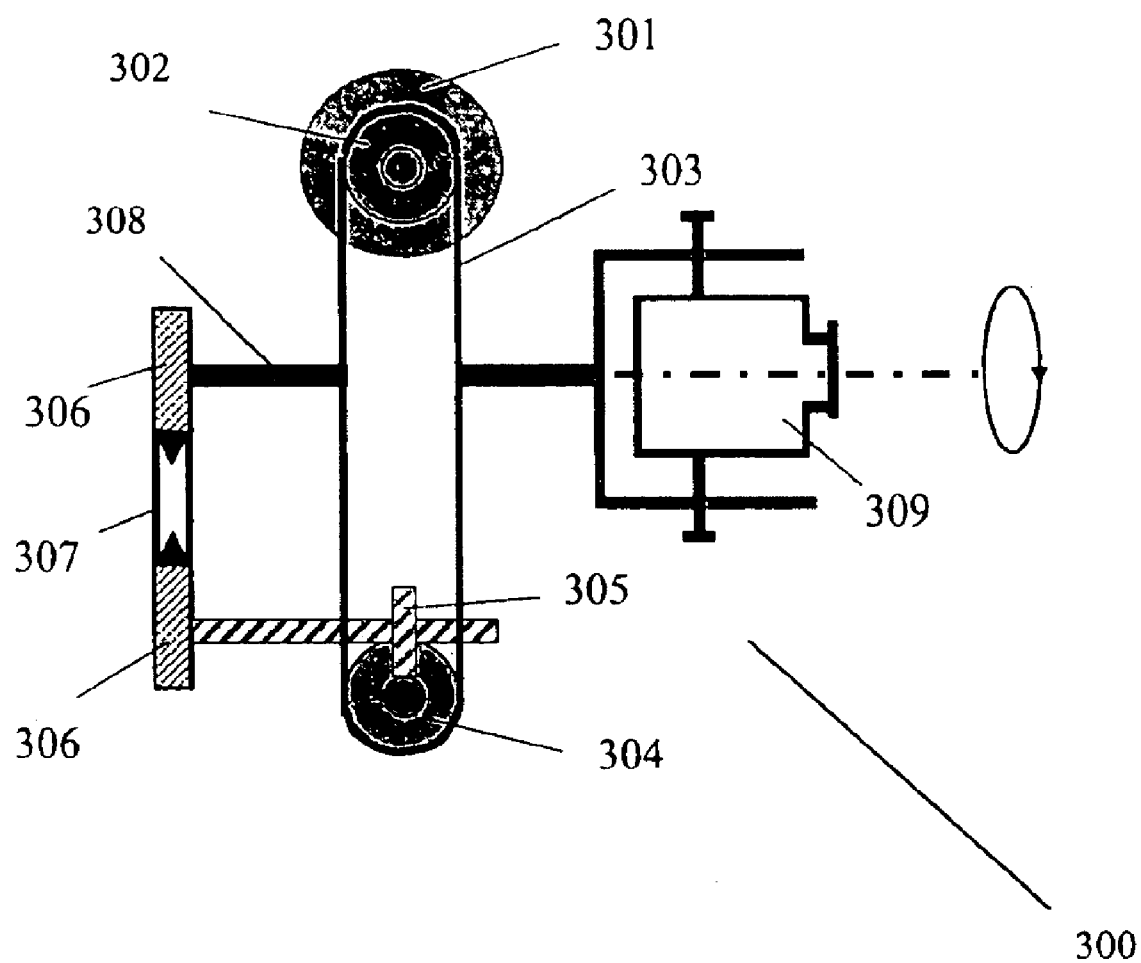
FIG. 3 illustrates a ball milling device which can be used to grind CNTs.

In some embodiments, the CNTs and/or particles are ground prior to mixing. In some embodiments, this is an integral part of the mixing process. Such grinding can be done using a variety of methods, such as with a ball-milling device as shown in FIG. 3. Referring to FIG. 3, a ball-milling device 300 comprises a motor 301 to which a wheel 302 is attached to a belt 303 which drives a second wheel 304. This second wheel 304, via a turbine 305, gear 306, and chain 307 assembly, drives a shaft 308 which spins a milling chamber 309. It is in this milling chamber 309 that the CNTs and/or particles are placed.

Mixing the CNTs and particles can be done in a variety of ways. In some embodiments, the CNTs and particles are dry mixed. In some embodiments, the particles and/or the CNTs are separately pre-dispersed. Pre-dispersion, according to the present invention, can involve suspension and/or dispersal in a solvent. Solvents can be any solvent or solvents which suitably disperses the CNTs and/or particles, according to the present invention. Such solvents include, but are not limited to, water, isopropyl alcohol (IPA), methanol, ethanol, tetrahydrofuran (THF), $CH_2Cl_2$, cyclohexane, and combinations thereof. In general, it is advantageous in most embodiments of the present invention for the solvent to be easily removed (as in evaporation). In some embodiments, ultrasonication is used to facilitate the suspension and/or dispersal of the CNTs and/or particles in a solvent.

Mixing, according to the present invention, is generally done in such a way as to achieve a desired ratio (e.g., weight percent) of CNTs in a particulate matrix so as to effect an optimum or desired CNT density for field emission. Such ratios are generally dependent on the materials used, the particle size, the homogeneity of the mixing, the thickness of the mixture layer, etc.

In some embodiments, particles have a lamellar shape and align with CNTs if a shear force is applied. Nanotubes in a mixture can thus be aligned in the same direction so as to effect the CNTs orientation on the cathode to improve field emission performance. More specifically, CNTs can be mixed with clay particles forming a water-based sol or gel.

In some embodiments, additional materials are mixed together with the CNTs and particles. Such additional materials may include, but are not limited to, binders, surfactants, dispersal agents, and combinations thereof.

Application of the mixture to a substrate can be accomplished in a variety of ways. Generally, either a pre-formed composite material comprising CNTs and particles is contacted with a substrate using a contacting means, or a mixture of CNTs and particles is applied to a substrate using a deposition means. In some embodiments, the CNT and particle mixture is first dispersed in a solvent and then deposited on the substrate, wherein the solvent is subsequently removed. In some embodiments, the CNT and particle mixture is deposited over an area in a particular arrangement or pattern. In some embodiments, this is done using a shadow mask. Such deposition means include, but are not limited to, spraying, brushing, electrophoretic deposition, dipping, dispensing, screen printing, ink jet printing, spin-coating, and combinations thereof. In some embodiments, the substrate is heated before, during, and/or after the deposition. Such heating can serve to aid solvent removal.

Figure 4:
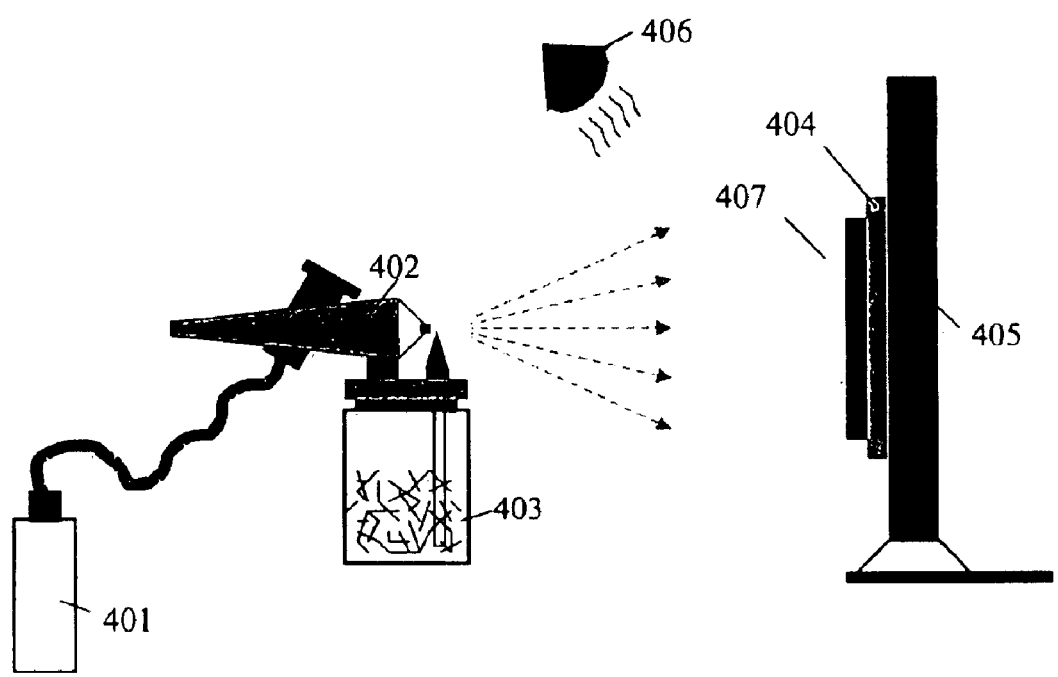
FIG. 4 illustrates how spraying can be used to deposit a CNT and particles mixture on a substrate.

FIG. 4 illustrates an embodiment wherein the CNT and particle mixture is sprayed onto a substrate. A condensed gas 401 is used to charge an atomizer 402 containing a solvent-suspended mixture of CNTs and particles 403. Mixture 403 is sprayed onto a substrate 404, optionally in contact with heater 405 and/or infrared (IR) heat lamp 406, to form cathode material layer 407 comprising CNTs and particles.

Figure 5:
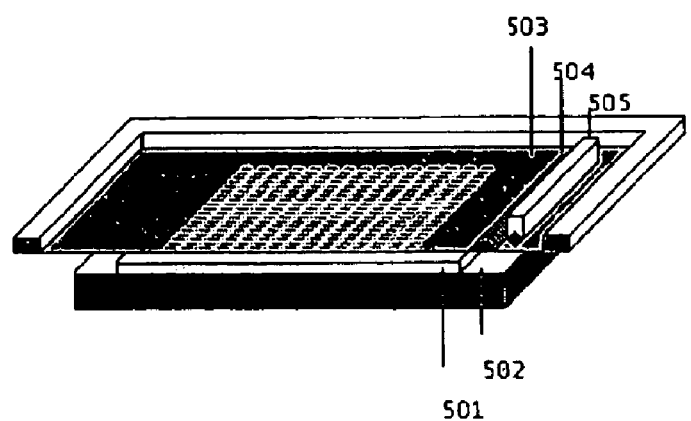
FIG. 5 illustrates a screen printing device, which can be used in the depositing of a CNT and particles mixture onto a substrate.
Figure 5:
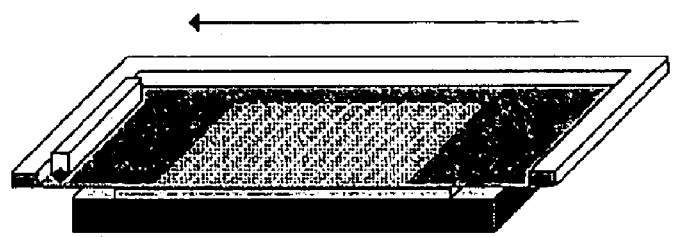
Figure 5:
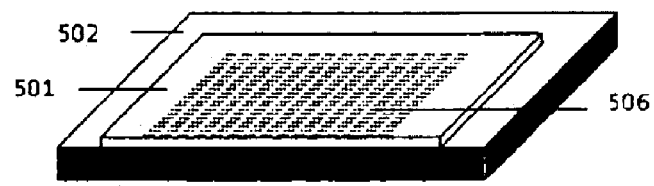

FIGS. 5A–C illustrate a screen printing method by which CNT and particle mixtures can be deposited onto a substrate according to some embodiments of the present invention. Referring to FIG. 5A, a substrate 501 is placed on a substrate stage/chuck 502 and brought in contact with an image screen stencil 503. A paste 504 comprising CNTs and particles is then "wiped" across the image screen stencil 503 with a squeegee 505, as shown in FIG. 5B. The paste 504 then contacts the substrate 501 only in the regions directly beneath the openings in the image screen stencil 503. The substrate stage/chuck 502 is then lowered to reveal the patterned cathode material 506 on substrate 501, as shown in FIG. 5C. The patterned substrate is then removed from the substrate stage/chuck.

Figure 6:
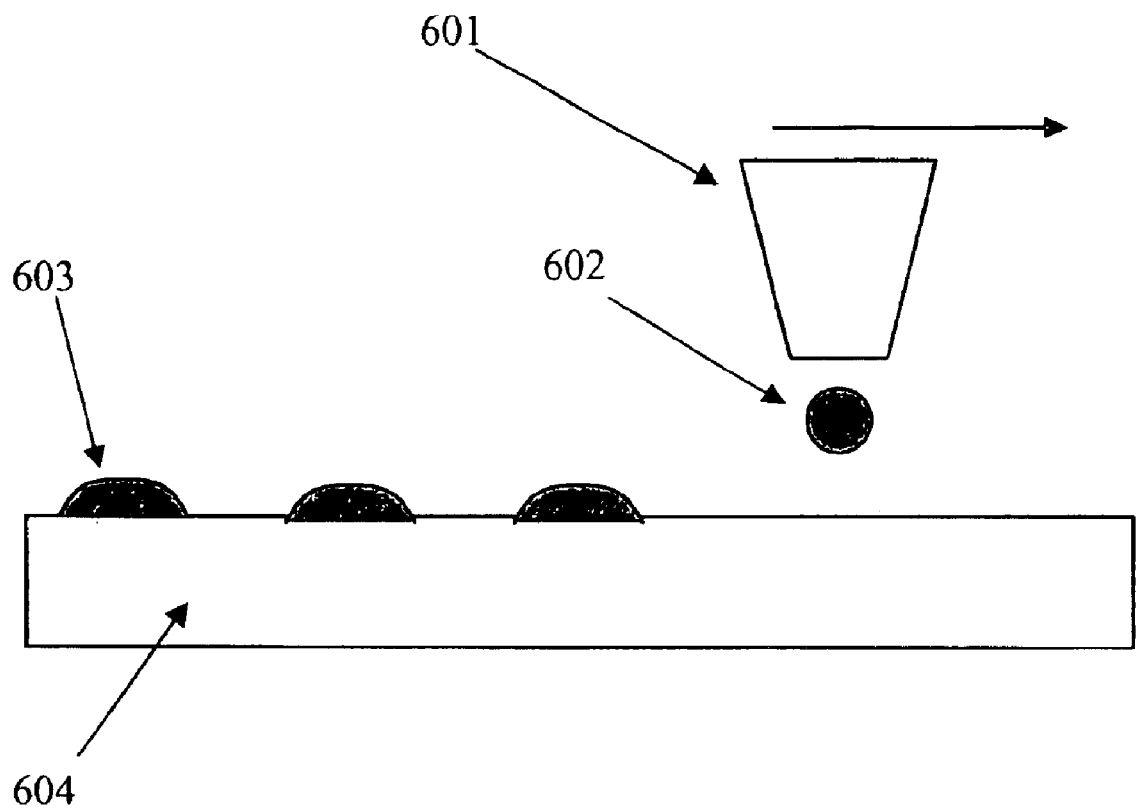
FIG. 6 illustrates how dispensing or ink jet printing can be used to deposit a CNT and particle mixture on a substrate.

FIG. 6 illustrates an embodiment wherein a dispensor or an ink jet printer is used to deposit a CNT and particle mixture onto a substrate. Referring to FIG. 6, printing head 601 is translated over a substrate 604 in a desired manner. As it is translated over the substrate 604, the printing head 601 sprays droplets 602 comprising CNTs and particles dispersed in a solvent. As these droplets 602 contact substrate 604, they form printed cathode material 603 comprising CNTs and particles. In some embodiments, the substrate 604 is heated so as to effect rapid evaporation of solvent within said droplets. Heat and/or ultrasonic energy may be applied to the printing head 601 during dispensing.

In some embodiments, the cathode of the present invention, once fabricated, is heated in a vacuum environment prior to incorporating it into a field emission device.

Figure 7:
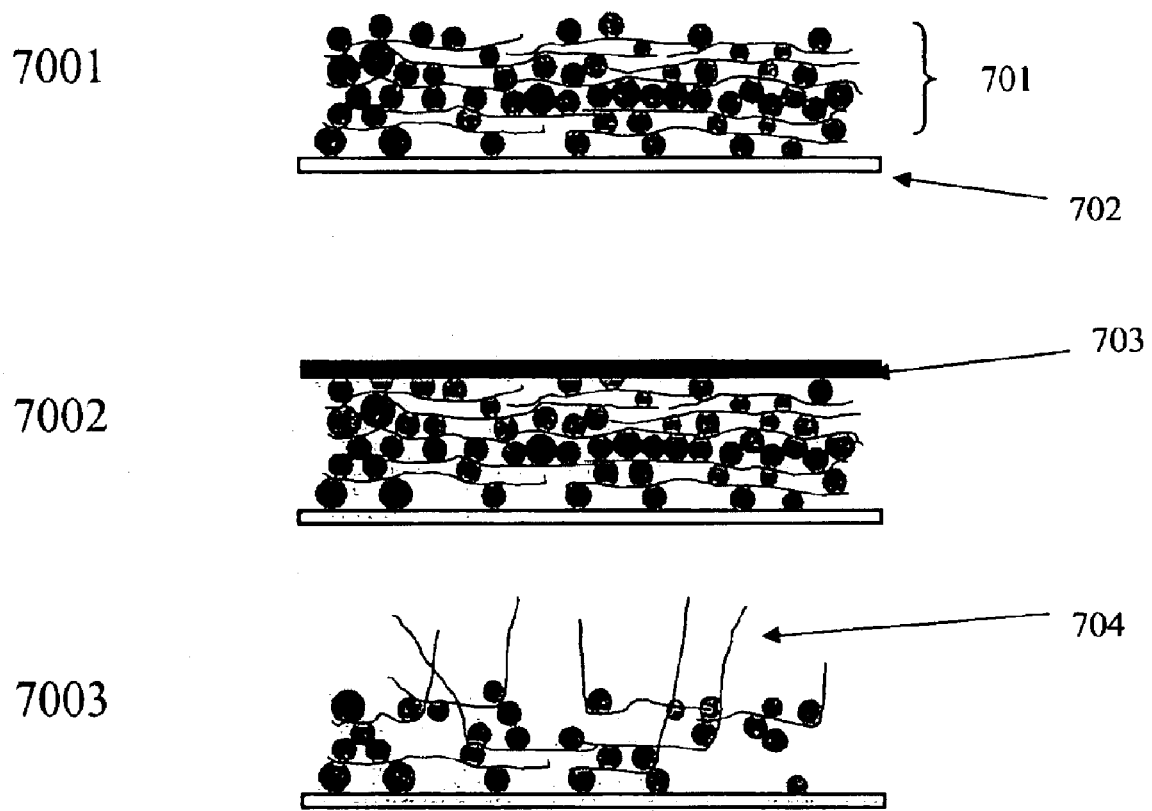
FIG. 7 illustrates a process whereby a cathode of the present invention is "activated" by a taping procedure.

In some embodiments, an activation process is used to activate the layer comprising the CNTs, as described in commonly assigned, co-pending U.S. patent application Ser. No. 10/269,577, filed Oct. 11, 2002, incorporated herein by reference. In some embodiments, this activation process comprises a taping process. This taping process is believed to effect alignment of CNTs at the surface, which is thought to enhance field emission properties of the cathode. Referring to FIG. 7, a cathode, comprising a substrate 702 and a cathode material 701 is provided in step 7001. The cathode material comprises CNTs and particles. In step 7002, a tape 703 is placed on top of the cathode material 701 with adhesive side toward the cathode material 701. In step 7003, tape 703 is removed to yield an activated layer comprising oriented CNTs 704.

In embodiments utilizing metallized CNTs, such metallized CNTs can be deposited in an aligning field or subjected to an aligning field after deposition, such as according to procedures put forth in commonly assigned, co-pending U.S. patent application Ser. No. 10/406,928, incorporated herein by reference.

Control over the density of CNTs in a deposited film (e.g., CNTs+particle layer) is achieved by varying the ratio of CNT materials to the particle powders. Optimization of this results in an improvement of the field emission properties of the deposited film by lowering the electric field required to extract electron emission from the film. No high temperature processing steps are needed in this invention, all processes can be carried out at, or near, room temperature.

The following examples are provided to more fully illustrate some of the embodiments of the present invention. The examples illustrate methods by which CNTs are mixed with particles and the resulting composition incorporated into a field emission devices as a cathode material. It should be appreciated by those of skill in the art that the techniques disclosed in the examples which follow represent techniques discovered by the inventors to function well in the practice of the invention, and can thus be considered to constitute exemplary modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Figure 13:
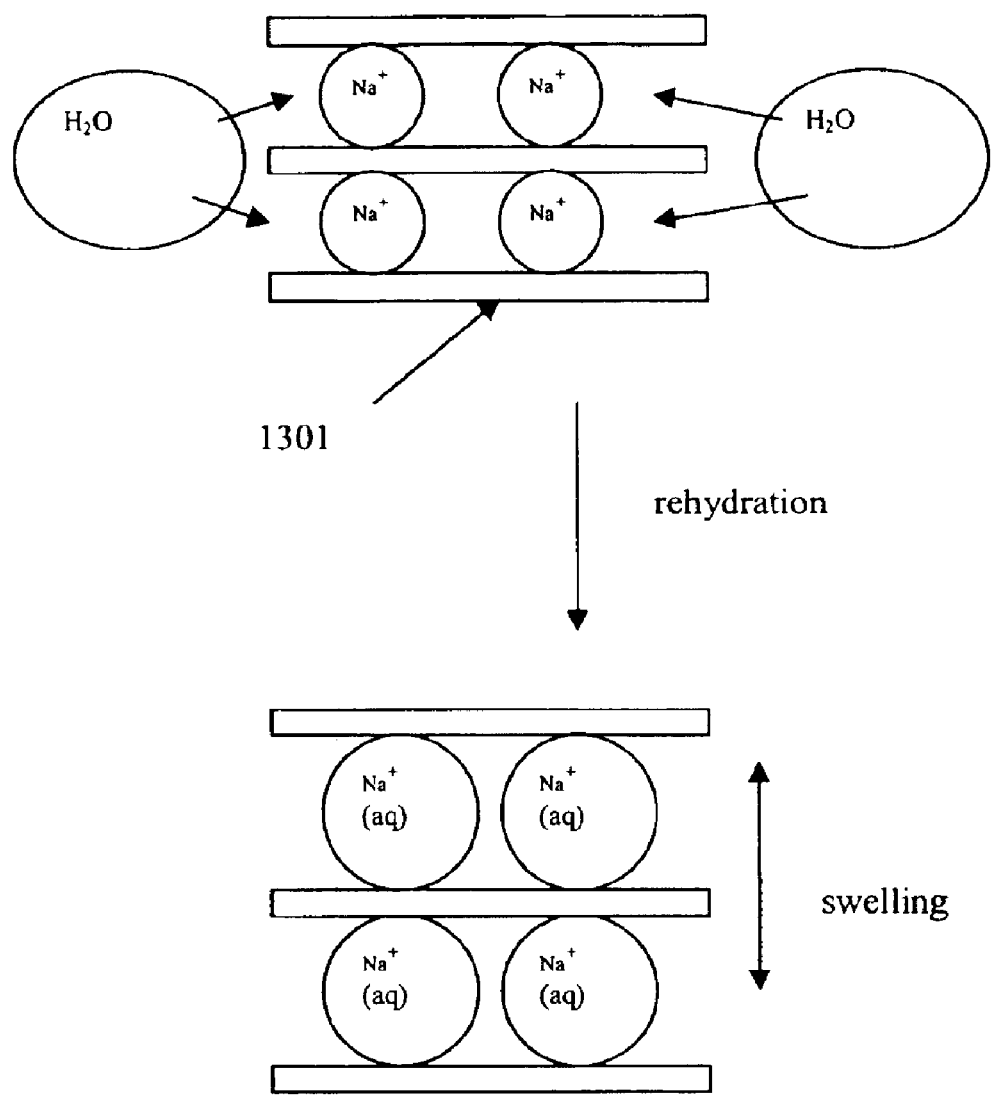
FIG. 13 illustrates a swelling of clay particles as they are rehydrated.

This example illustrates an embodiment of the present invention, wherein SWNTs are mixed with alumina ($Al_2O_3$) nanoparticles to achieve an appropriate density, and then applied to a substrate and used as the cathode in a field emission display (see FIGS. 2 and 13). A detailed example of this embodiment is given in an effort to better illustrate the invention.

SWNTs were obtained from CarboLex, Inc., Lexington, Ky., USA. These SWNTs were about 1–2 nm in diameter and about 5–20 μm in length. For the purposes of this example, it will be understood that SWNTs are simply a subset of CNTs and that in many cases the terms can be used interchangeably. $Al_2O_3$ nanoparticles were obtained from Alfa Aesar, Ward Hill, Mass., USA. The nanoparticles are as small as 10–20 nm with a purity of 99.98%.

A simple ball mill was used to grind SWNT bundles. FIG. 3 is an illustrative diagram of this ball mill. The milling rate of this machine is on the order of about 50–60 revolutions per minute. In this method, 1 g of SWNTs, along with tens of $Al_2O_3$ balls used for grinding (5–10 mm in diameter) were mixed with 200–300 ml isopropyl alcohol (IPA). The material was ground for 1–14 days in order to disperse the carbon nanotubes. Note that in some embodiments, a surfactant (about 1 drop per 100 ml IPA) or similar material was added to the mixture in order to achieve better dispersion of the carbon nanotubes.

As $Al_2O_3$ nanoparticles easily cluster together, it is helpful to disperse them before they are mixed with the SWNTs. Accordingly, 1 g of $Al_2O_3$ nanoparticles were mixed in 200–300 ml of IPA in a beaker with stirring provided by a magnetic stir bar actuated by a hot plate/magnetic stirrer. The material was stirred 1–24 hours so that the nanoparticles could be separated from each other.

Figure 8:
FIGS. 8A and B illustrate scanning electron micrographs which contrast mixtures of A) 90 wt. % SWNTs+10 wt. % nanoparticles with B) 10 wt. % SWNTs+90 wt. % nanoparticles.
Figure 8:
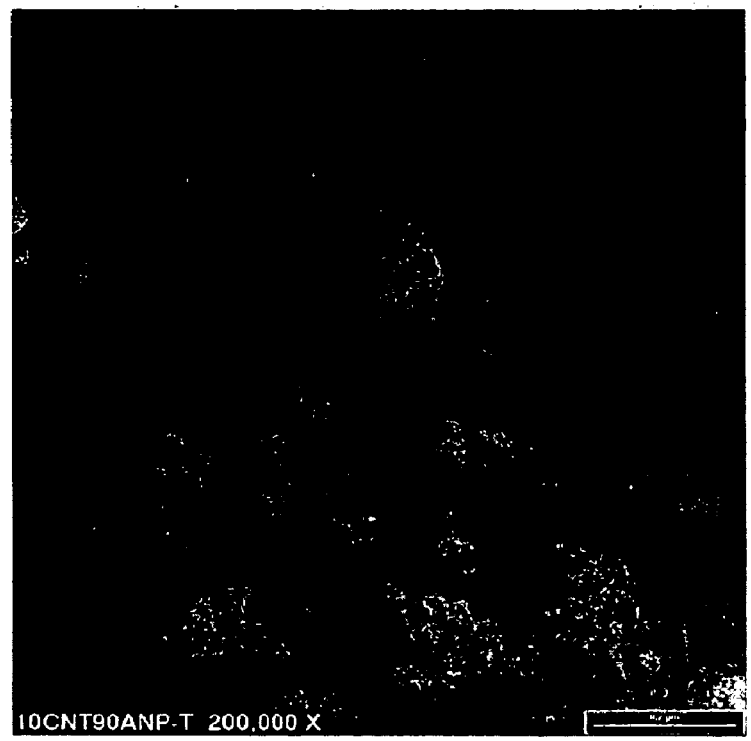

The ground SWNTs and dispersed $Al_2O_3$ nanoparticles were mixed according to different weight ratios: 10 wt. % SWNTs+90 wt. % nanoparticles, 25 wt. % SWNTs+75 wt. % nanoparticles, 50 wt. % SWNTs+50 wt. % nanoparticles, 75 wt. % SWNTs+25 wt. % nanoparticles, and 90 wt. % SWNTs+10 wt. % nanoparticles. Because SWNTs and nanoparticles easily clump together if they are not continuously agitated, an ultrasonic horn or bath was used to redisperse them in IPA solution immediately prior to spraying them onto the substrates. In this experiment, the mixture was sprayed onto conductive ITO (indium tin oxide)-coated glass. The mixture was sprayed onto the substrate with an area of 2×2 $cm^2$. In order to achieve better coating uniformity and dispersion on the substrate, additional IPA can be added to the above solution before spraying. In this experiment, the solution used for spraying was comprised of about 0.1 g of the nanotube/nanoparticle mixture in 100 ml IPA. In order to prevent the IPA from flowing to undesired regions of the substrates, the substrates were heated to approximately 70° C., both on the front and back side during the spraying process in an effort to evaporate the IPA quickly. The substrates were sprayed back and forth or up and down several to tens of times until the entire surface was coated with the mixture. The resulting thickness of the mixture was about 1–20 μm. The substrates were then allowed to dry in air. Shown in FIG. 8 are scanning electron micrographs which contrast a) 90 wt. % SWNTs+10 wt. % nanoparticles with b) 10 wt. % SWNTs+90 wt. % nanoparticles. FIG. 4 illustrates the spraying process.

Figure 9:
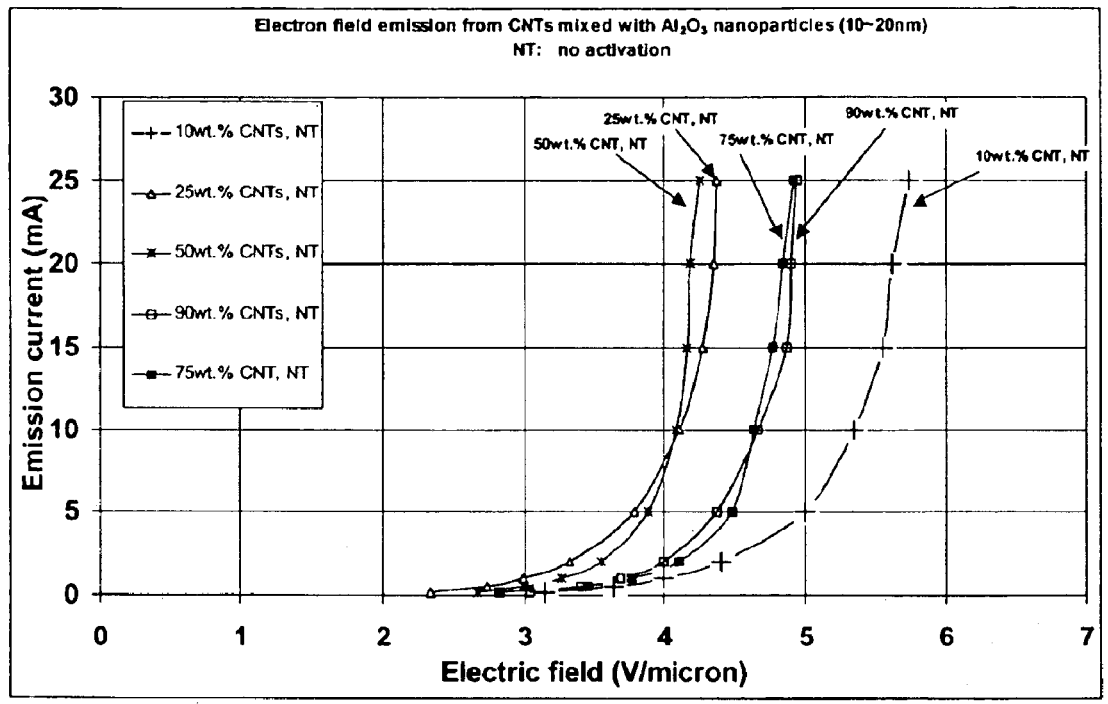
FIG. 9 illustrates electron field emission I/V curves of cathodes comprising CNTs and alumina nanoparticles.

To compare field emission properties, 100 wt. % SWNTs, without any $Al_2O_3$ nanoparticles, were also sprayed onto the ITO glass substrate. All cathodes were then tested by mounting them, together with a phosphor screen, in a diode configuration, like that shown in FIG. 2, with a gap of about 0.5 mm between the anode and cathode. The test assembly was placed in a vacuum chamber and pumped to $10^{-7}$ Torr. The electrical properties of the cathode were then measured by applying a negative, pulsed voltage (AC) to the cathode and holding the anode at ground potential and measuring the current at the anode (a DC potential could also be used for the testing). A graph of the emission current versus electric field for some samples is shown in FIG. 9.

Figure 10:
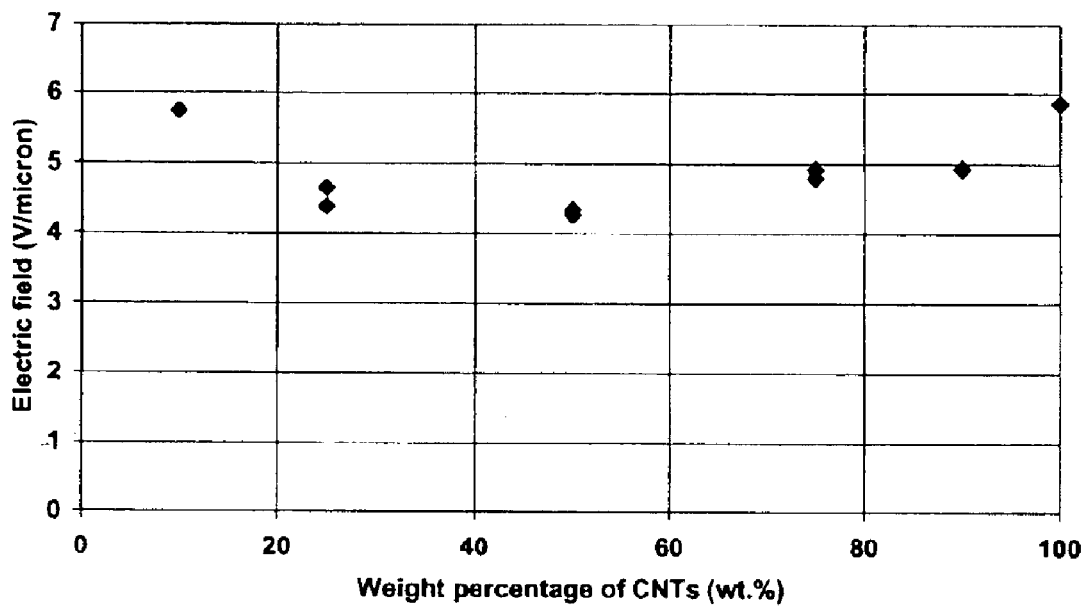
FIG. 10 illustrates a plot of electric field as a function of CNT concentration (balance is alumina nanoparticles) for various cathodes of the present invention at 25 mA of emission current.

It can be seen from FIG. 10 that as the concentration of the CNT material decreases, the electric field (as measured by the voltage between anode and cathode divided by the gap between anode and cathode) needed to extract a current density of 6.25 mA/$cm^2$ also decreases. The best concentration of SWNTs in the nanotube/nanoparticle mixture is between 20% and 60%. Thus, by lowering the concentration, the density of CNT material decreases to the point at which the CNTs no longer shield each other. One can also see that when the CNT concentration decreases below 20%, the required field increases. This is probably a result of the CNT concentration becoming too small and there being too few CNT fibers available to emit electrons.

While not intending to be bound by theory, it is believed that if the CNT concentration is too high, the carbon nanotube fibers electrically shield the applied field from one another. Ideally, the distance between the tubes, if they were all perfectly aligned, would be about the same distance as the length of the tube. As the density continues to decrease, the electrical shielding issue does not improve significantly, but the number of fibers available for emitting electrons continues to decrease with the density. Thus, there should be an optimal density of tubes that gives the best emission parameters. The data shown here indicates that this optimum density is realized with a mixture of CNT material and alumina nanoparticles that is in the range of about 20%–60% weight concentration of CNT material.

Example 2

This example illustrates how activation processes are used to further enhance the field emission properties of the cathode of the present invention.

In an earlier disclosure (commonly assigned, co-pending U.S. patent application Ser. No. 10/269,577, filed Oct. 11, 2002, incorporated herein by reference), a process of "activating" the CNT film by applying an adhesive tape material to the film and then pealing the adhesive tape away was described. This also has the effect of lowering the density of the CNT fibers. This activation process was tried in combination with the CNT/alumina powder mixture described above. The results were consistent.

After a mixture of SWNTs and $Al_2O_3$ is sprayed onto a substrate, an adhesive tape process was used to remove the top layer of the materials on the surface. In this method, clear tape was used to remove the mixture, although it is likely that there are many brands and varieties of adhesive tape that can be used with similar results. The tape was contacted to the coating using a laminating process in which the adhesive side of the tape touches both the carbon nanotubes and the alumina particles. Care is taken to ensure that there is no air between the tape and the SWNTs and $Al_2O_3$ particle coating (if a bubble is present, the mixture at that area will not be uniformly removed). A rubber roller is used to further press the tape in order to eliminate air at the intersection between the tape and the mixture coating. Finally, the tape is removed with the result that less than 50% of the mixture is left on the substrate. This taping process is illustrated in FIG. 7.

Figure 11:
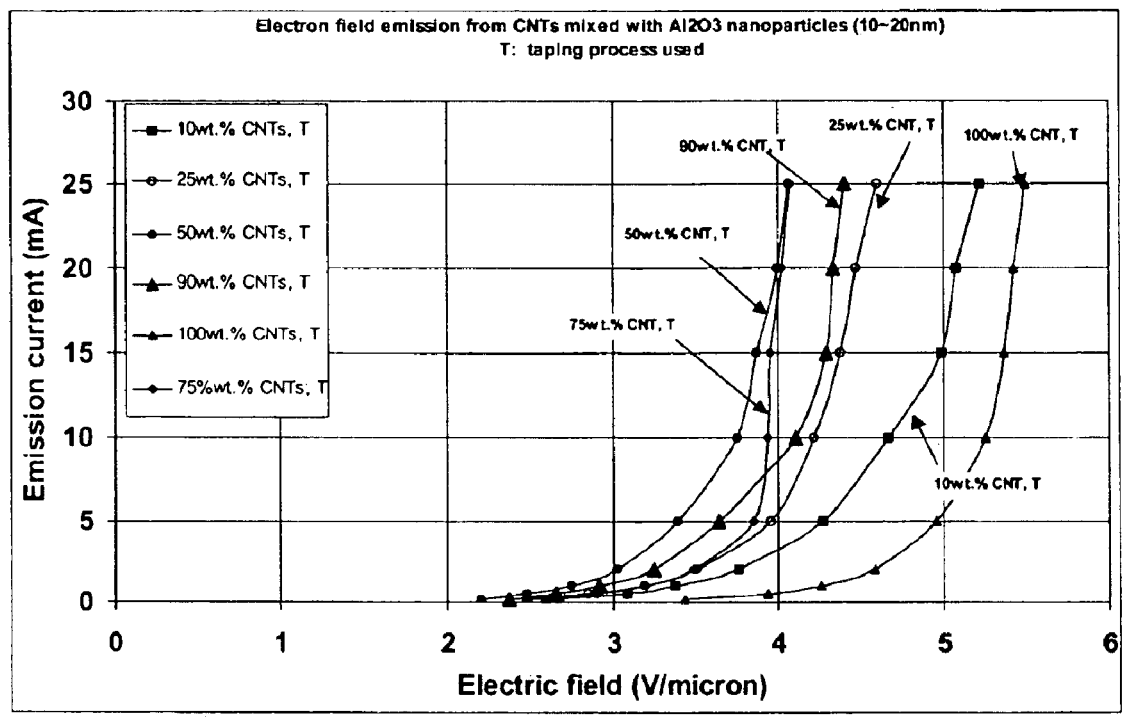
FIG. 11 illustrates electron field emission I/V curves from CNTs mixed with alumina nanopowders, then activated using a taping process.
Figure 12:
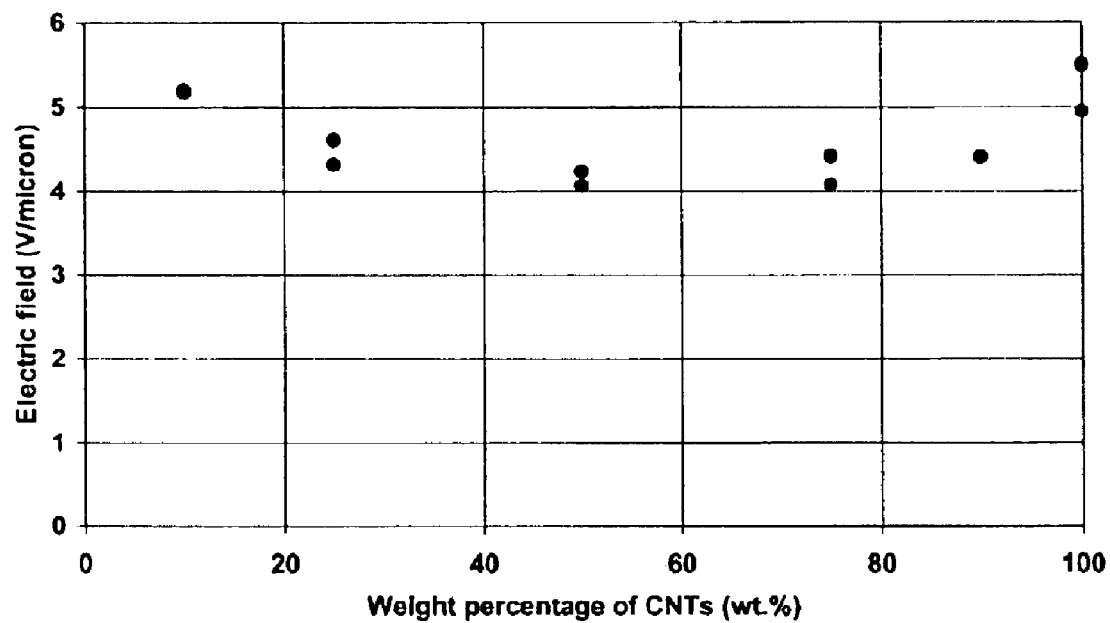
FIG. 12 illustrates a plot of electric field as a function of CNT concentration (balance is alumina nanoparticles) for various cathodes of the present invention at 25 mA of emission current, wherein the cathodes have been activated by a taping process.

Activated samples were tested for their emission current versus electric field (I/V) properties in the same manner that the unactivated samples were. FIG. 11 shows some of the I/V results of this experiment. FIG. 12 plots the electric field when each of the samples reached 25 mA of emission current (see FIG. 11) versus the CNT concentration as a percentage of the weight of CNT material. It is interesting to note that for the samples treated with adhesive tape, the concentration yielding optimal performance has shifted to a range of 40–80 wt. % of CNT in the CNT+$Al_2O_3$ mixture. Since the tape activation process lowers the concentration of the CNT material as described earlier, this results in the shifting of the optimal concentration range to higher initial concentrations of CNT fibers in the $Al_2O_3$ nanoparticle powder, as seen in FIG. 12.

Example 3

This example illustrates some embodiments of the present invention which utilize clay particles.

As stated earlier, particles may be nanoparticles and they may also include porous materials such as porous silicon or one of several varieties of zeolite minerals. These particles may also include layered materials, such as clay particles. Examples of clays include, but are not limited to, laponite, bentonite or hectorite. Clays are layered materials with spaces between the layers that can absorb water molecules or positive and negative ions (cations or anions) and undergo exchange interaction of these ions with solvents. Clays have very unique properties. When they are dried, the molecules or ions between the layers can come out, the gaps between the layers can close and the layer stack can shrink significantly. Correspondingly, when the clay particles are rehydrated, as shown in FIG. 13, the space between the clay particle layers 1301 expands.

Clay particles dispersed in solvents such as water can significantly change the viscosity of the solution. While there are other materials that will thicken waterborne solutions, clay particles are unique in that the viscosity is shear sensitive (shear forces will lower the viscosity by orders of magnitude).

Figure 14:
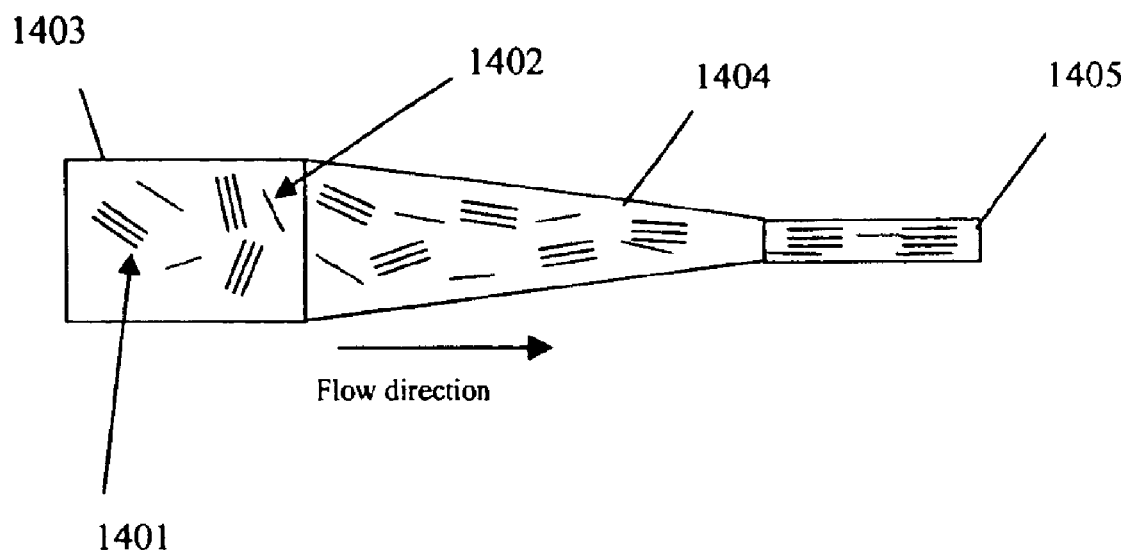
FIG. 14 illustrates how shear forces can be used to align mixtures of CNTs and lamellar (clay) particles.

Clay particles may have several advantages over other particles in a CNT+nanoparticle composite. When extruded through tubes or pipes, the clay molecules may also align with each other by shear interaction with the wall of the extruder. If CNTs are included in a solution of clay particles, it is possible that the alignment of the clay particles will align the carbon tubes in a preferred direction or within a preferred plane or layer as illustrated in FIG. 14, wherein layered clay particles 1401 and CNTs 1402 flow from a region 1403 where they are randomly oriented, through a region 1404, and into a region 1405 where they are oriented.

Figure 15:
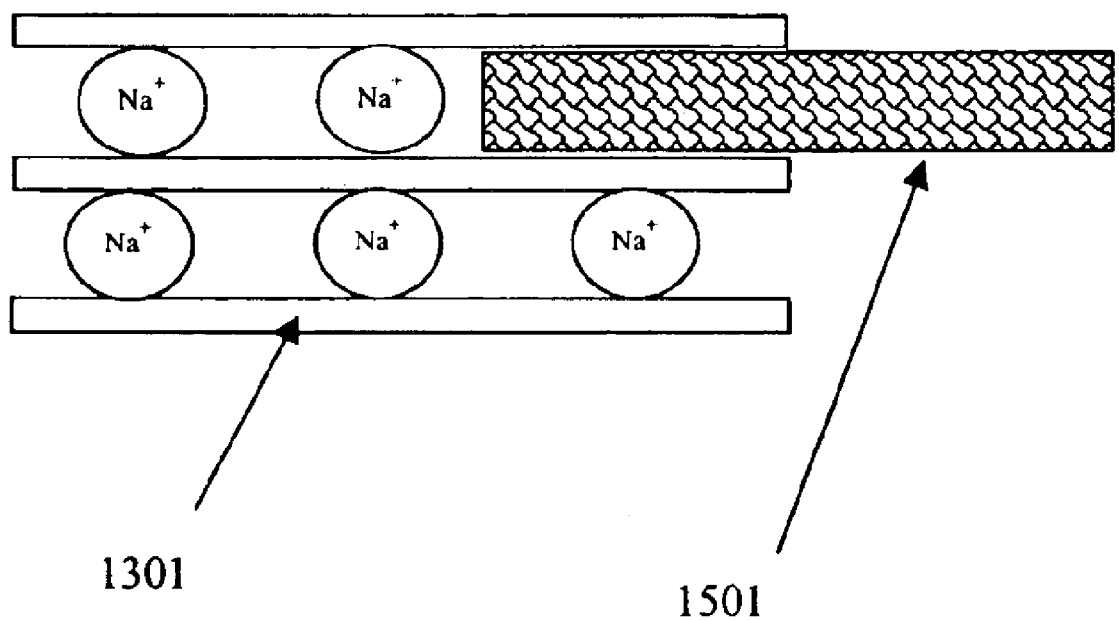
FIG. 15 illustrates how CNTs can be trapped between the layers of clay particles as a result of dehydration.

Clay particles may also help trap or capture CNTs between their layers during the process of dehydration or shrinking of the layers. The gaps between the layers can range from about a few nanometers to tens of nanometers, sufficiently large so as to allow CNTs to penetrate into them. As the gap shrinks, the CNT may be captured between the layers of the clay particles and thus anchored to the particle, as shown in FIG. 15, wherein a CNT 1501 is trapped between clay particle layers 1301. This may add greatly to the stability of the CNT+nanoparticle composite. In some embodiments, the CNT fiber may require functionalization to aid the penetration of the CNT fiber between the layers. Since the clay particles are flat, pancake-like particles, it is easy for CNTs to be trapped or captured between particles when the solution is dried.

An additional advantage that clay particles have over other particles or nanoparticles is that they can thicken the solution that will be used as a paste for screen printing or as an ink for dispensing or ink jet printing without adding organics or materials that can outgas in a vacuum environment. As a water-based material, it is more environmentally-friendly than other screen printing pastes or inks. As noted earlier, clay solutions will flow well under sheer force, but can set to a gel consistency when stationary. This makes for an ideal screen printing paste since it can easily be spread or "wiped" across the screen using a squeegee (see FIG. 5), but sets to a gel and does not flow after printing. This can greatly improve the resolution of the printed pattern. As a dispensing ink (see FIG. 6), it has similar advantages. It can flow in the dispensing tube with low viscosity, aligning the particles in the process, but once dispensed on the substrate, it sets to a gel consistency that does not flow. Since the solution is water based, the printed gel can easily be dried with heat (on the order of about 100° C.) to reduce it to clay particles and CNT fibers. Unlike most screen printing pastes, this material does not require firing at higher temperatures.

Figure 16:
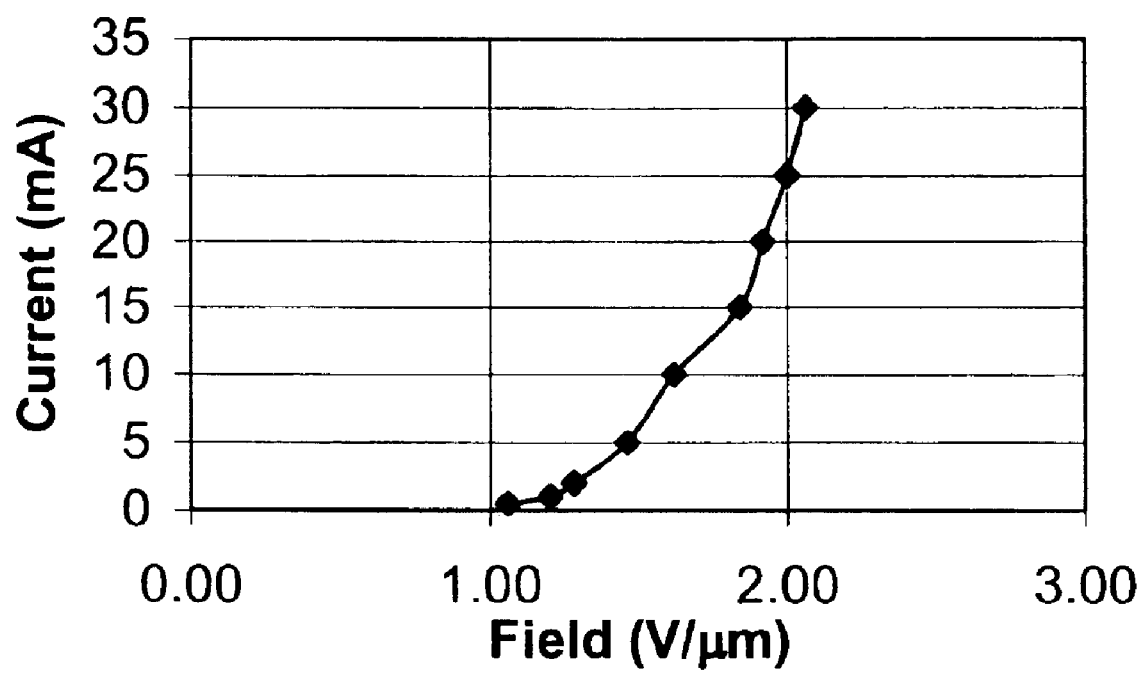
FIG. 16 illustrates the I-V characteristics of a cathode comprising CNTs and clay particles.

A simple experiment was performed to demonstrate that clay particles mixed with CNTs can be screen printed and that high quality field emission results from the process. A quantity of 5.6 grams of clay gel (0.05% to 3% laponite from Southern Clay Products, in water) and 0.1 gram of CNTs were ground in a mortar to make CNT ink. A screen printer was used to print this ink onto an ITO glass substrate as described earlier (FIG. 5). The sample was dried in an oven at 100° C. for half an hour. Activation with a tape layer may be used to improve the field emission properties (described earlier). The I-V characteristics are shown in FIG. 16. The size of the substrate was 3 cm×3 cm.

Figure 17:
FIG. 17 illustrates an image on a phosphor screen generated by a cathode comprising CNTs and clay particles.

An image on a phosphor screen as a result of the electron current emitted from the clay particle+CNT composite cathode material is shown in FIG. 17. Referring to FIG. 17, the individual sub-pixels in this figure are 6 mm long by about 1 mm wide. This demonstrates that pixel features can be printed with screen printing techniques, yet require only low temperature processing steps to cure and prepare for operation in a field emission device or display.

Example 4

While numerous other applications exist, this example serves to illustrate how a field emission display device comprising a cathode of the present invention can be integrated into a data processing system.

Figure 18:
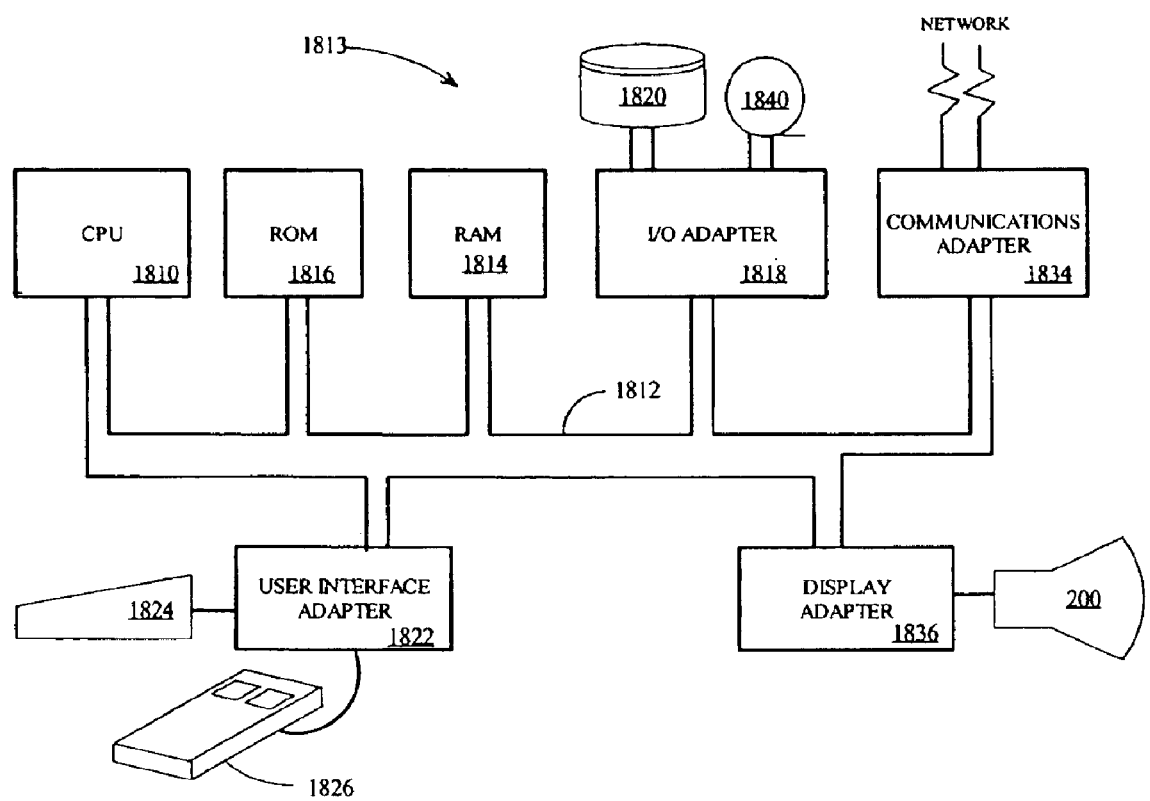
FIG. 18 illustrates a data processing system configured in accordance with the present invention.

A representative hardware environment for practicing the present invention is depicted in FIG. 18, which illustrates an exemplary hardware configuration of data processing system 1813 in accordance with the subject invention having central processing unit (CPU) 1810, such as a conventional microprocessor, and a number of other units interconnected via system bus 1812. Data processing system 1813 includes random access memory (RAM) 1814, read only memory (ROM) 1816, and input/output (I/O) adapter 1818 for connecting peripheral devices such as disk units 1820 and tape drives 1840 to bus 1812, user interface adapter 1822 for connecting keyboard 1824, mouse 1826, and/or other user interface devices such as a touch screen device (not shown) to bus 1812, communication adapter 1834 for connecting data processing system 1813 to a data processing network, and display adapter 1836 for connecting bus 1812 to display device 200. CPU 1810 may include other circuitry not shown herein, which will include circuitry commonly found within a microprocessor, e.g., execution unit, bus interface unit, arithmetic logic unit, etc. CPU 1810 may also reside on a single integrated circuit.

It should be noted that all of the embodiments described herein can be used to create the display in system 1813.

Although the present invention and its advantages have been described in detail, it should be understood that various changes, substitutions and alterations can be made herein without departing from the spirit and scope of the invention as defined by the appended claims.

What is claimed is:

1. A method comprising the steps of:
    a) forming a mixture of carbon nanotubes and particles; and
    b) depositing a layer of the mixture of carbon nanotubes and particles onto a substrate to form a cathode.

2. The method of claim 1, wherein the nanotubes are selected from the group consisting of single-wall carbon nanotubes, double-wall carbon nanotubes, multi-wall carbon nanotubes, buckytubes, carbon fibrils, chemically-modified carbon nanotubes, derivatized carbon nanotubes, metallic carbon nanotubes, semiconducting carbon nanotubes, metallized carbon nanotubes, and combinations thereof.

3. The method of claim 1, wherein the particles are selected from the group consisting of spherical particles, disk-shaped particles, lamellar particles, rod-like particles, metal particles, semiconductor particles, polymeric particles, ceramic particles, dielectric particles, clay particles, fibers, nanoparticles, and combinations thereof.

4. The method of claim 1, wherein the step of forming a mixture of carbon nanotubes and particles comprises a milling operation.

5. The method of claim 1, wherein the step of forming a mixture of carbon nanotubes and particles comprises solvent dispersal.

6. The method of claim 1, wherein the mixture of carbon nanotubes and particles is deposited using a method selected from the group consisting of spraying, brushing, electrophoretic deposition, dipping, dispensing, screen printing, ink jet printing, and combinations thereof.

7. The method of claim 6, further comprising a step to remove the solvent from the mixture after depositing the mixture on the substrate.

8. The method of claim 1, further comprising a taping process to activate the cathode.

9. The method of claim 1, further comprising a method of aligning the carbon nanotubes within the layer of carbon nanotubes and particles.

10. The method of claim 1, wherein the particles are lamellar.

11. The method of claim 10, further comprising a method of aligning the carbon nanotubes using a shear force applied to the mixture of the carbon nanotubes and lamellar particles.

12. The method of claim 10, wherein the lamellar particles comprise clay.

* * * * *